United States Patent [19]

Shimizu

[11] 4,162,108

[45] Jul. 24, 1979

[54] HYDRAULIC ANTI-SKID DEVICE

[75] Inventor: Kazuaki Shimizu, Fujisawa, Japan

[73] Assignee: Nissan Motor Company, Limited, Yokohama, Japan

[21] Appl. No.: 826,250

[22] Filed: Aug. 19, 1977

[30] Foreign Application Priority Data

Aug. 23, 1976 [JP] Japan .................................. 51-100373

[51] Int. Cl.² .............................................. B60T 13/68
[52] U.S. Cl. ...................................... 303/115; 303/116
[58] Field of Search ............... 188/195, 349; 303/6 C, 303/113, 115, 92, 22 R, 116–119, 89

[56] References Cited

U.S. PATENT DOCUMENTS

| | | | |
|---|---|---|---|
| 3,722,960 | 3/1973 | Von Lowis | 303/115 X |
| 3,727,989 | 4/1973 | Keady | 188/349 X |
| 3,801,160 | 4/1974 | Schafer et al. | 303/115 |
| 3,893,694 | 7/1975 | Inada | 303/115 |
| 3,913,984 | 10/1975 | Every et al. | 303/113 |
| 3,922,020 | 11/1975 | Koike et al. | 303/6 C |
| 3,967,861 | 7/1976 | Nagara | 303/6 C |
| 3,993,365 | 11/1976 | Kondo | 303/115 |

Primary Examiner—Stephen G. Kunin

[57] ABSTRACT

A stop locks an expansion valve of the anti-skid device in a position in which the expansion valve provides communication between a first passage located upstream of the expansion valve and a second passage interconnecting the expansion valve and a bypass valve during air bleeding, and an air bleed provides communication between the second passage and the atmosphere.

4 Claims, 2 Drawing Figures

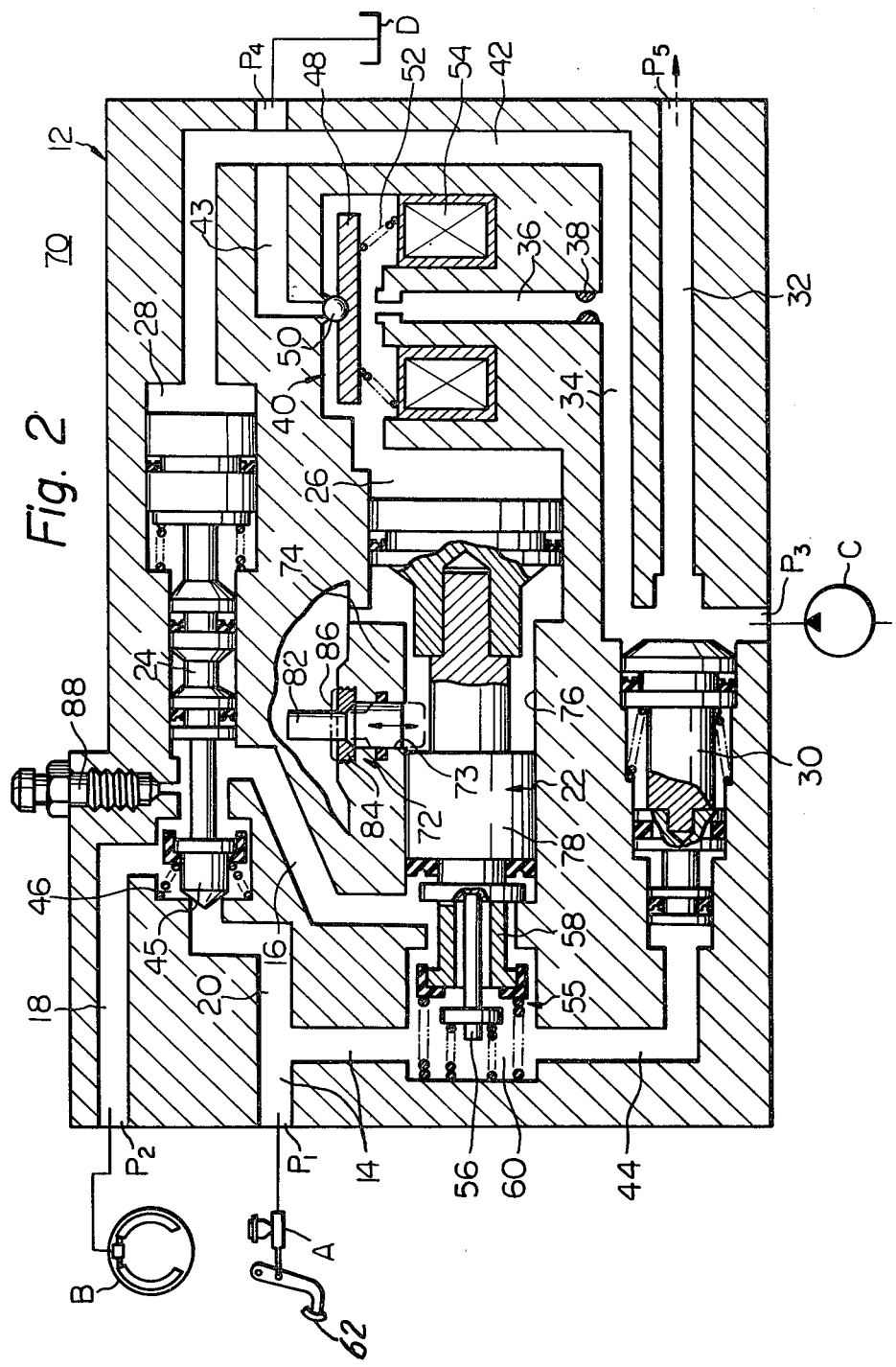

HYDRAULIC ANTI-SKID DEVICE

BACKGROUND OF THE INVENTION

1. Field of the Invention

The present invention relates generally to a hydraulic anti-skid device for use in a hydraulic braking system of a vehicle.

2. Description of the Prior Art

As is well known in the art, a hydraulic anti-skid device of this type is usually provided in a passageway supplying a hydraulic fluid pressure from a master cylinder to a brake unit such as a wheel cylinder and controls the supply of the hydraulic fluid pressure to the brake unit by means such as, for example, an electronic signal and a hydraulic fluid pressure fed by a pump and controlled by a regulator valve.

In the event of braking of a vehicle being effected by depressing a brake pedal thereof, when it is unnecessary to reduce the hydraulic fluid pressure fed to the brake unit as when the deceleration of the vehicle is not excessively great, the anti-skid device allows the hydraulic fluid pressure from the master cylinder to pass to the brake unit. Conversely, when it is necessary to reduce the hydraulic fluid pressure fed to the brake unit as when the deceleration of the vehicle is excessively great, a predetermined electronic signal is generated and the anti-skid device prevents the hydraulic fluid pressure from the master cylinder from being fed to the brake units and expands the fluid retained in the wheel cylinders to reduce the braking force exerted thereby.

Also, when the hydraulic fluid pressure from the pump is not fed because of a malfunction, the anti-skid device provides communication between the master cylinder and the brake unit irrespective of the presence and absence of the electronic signal. Such a hydraulic anti-skid device is described in detail below in connection with FIG. 1 of the accompanying drawings.

As shown in FIG. 1, a hydraulic anti-skid device 10 includes a control block 12 formed with ports $P_1$, $P_2$, $P_3$, $P_4$ and $P_5$. The port $P_1$ is connected to a master cylinder A, the port $P_2$ is connected to a brake units B (only one shown), the port $P_3$ is connected to a pump C, the port $P_4$ is connected to a reservoir tank D, and the port $P_5$ is connected to a power steering system (not shown) which is not directly related to the anti-skid device.

The port $P_1$ is communicable with the port $P_2$ on the one hand through passages 14, 16 and 18 and on the other hand through a passage 20 and the passage 18. The passage 20 is arranged in parallel with the passages 14 and 16. An expansion valve 22 is disposed so as to control communication between the passages 14 and 16 and a bypass valve 24 is disposed so as to control communication between the passage 18 and both the passage 16 and 20. The expansion valve 22 has a portion exposed to a chamber 26, while the bypass valve 24 has a portion exposed to a chamber 28.

The port $P_3$ communicates on the one hand with the port $P_5$ through a regulator valve 30 and a passage 32 and on the other hand with the chamber 26 through the regulator valve 30, a passage 34 and a passage 36. The passage 36 has formed therein an orifice 38. An electromagnetically operated armature valve 40 is provided for opening and closing the passage 36. The passage 34 is branched off to a passage 42 which communicates with the chamber 28. The port $P_4$ is communicable with the chamber 26 through a passage 43.

The regulator valve 30 regulates the hydraulic fluid pressure, fed from the pump C into the passages 32 and 34, in accordance with the hydraulic fluid pressure fed from the master cylinder A into a passage 44 which communicates with the passage 14.

The bypass valve 24 is moved into a left-hand position shown in the drawing by the fluid pressure fed into the chamber 28 through the passages 34 and 42 so that a differential valve 45 integral with the bypass valve 24 obstructs communication between the passages 18 and 20 and provides communication between the passages 16 and 18 through a chamber 46. When the fluid pressure is not fed in the chamber 28, the bypass valve 24 is pushed into a right-hand position in the drawing so that it provides communication between the passages 18 and 20 through the chamber 46 and obstructs communication between the passages 16 and 18. The bypass and differential valves 24 and 45 functions as a safety valve for ensuring a braking operation when a trouble take places in the pump C and/or the passage 34, 36 or 42.

The armature valve 40 includes an armature 48 provided with an armature ball 50 which normally closes the passage 43. A spring 52 urges the armature 48 into a position shown in the drawing in which the armature ball 50 closes the passages 43. A solenoid coil 54, when is fed with an electric current and is energized, attracts the armature 48 and the armature ball 50 to move them into a position in which the armature ball 59 opens the passage 43. When the armature ball 50 closes the passage 43, the fluid pressure is fed from the passage 34 into the chamber 26 through the passage 36, while when the armature ball 50 is attracted together with the armature 48 by the solenoid coil 54, the armature 48 obstructs communication between the chamber 26 and the passage 36. The solenoid coil 54 is electrically connected to an electronic control circuit (not shown) to receive therefrom an output signal for energizing the solenoid coil 54 when it is necessary to reduce the fluid pressure applied to the brake units B as when the deceleration of the vehicle has been excessively increased.

The expansion valve 22 is, when the fluid pressure from the passage 34 is fed in the chamber 26, pushed by the fluid pressure into a left-hand position shown in the drawing in which a check valve 55 of the expansion valve 22 is opened to provide communication between the passages 14 and 16 through a chamber 60. The check valve 55 comprises a valve 56 fixedly secured to the expansion valve 22 and a valve 58 engageable with and disengageable from the expansion valve 22. When the expansion valve 22 is in the left-hand position, the valves 56 and 58 are disengaged respectively from the valve 58 and a valve seat formed in the chamber 60 or the passage 16. The expansion valve 22 is, when the fluid pressure is absent in the chamber 26, moved in a right-hand position in the drawing in which the check valve 55 is closed to obstruct communication between the passages 14 and 16. At this time, the valves 56 and 58 are engaged respectively against the valve 58 and the valve seat.

The anti-skid device 10 thus described is operated as follows:

1. Normal operating period (when a trouble or malfunction does not occur anywhere in the anti-skid device 10 and the pump (C).

(1) When the brake pedal 62 of the vehicle is not depressed so that the master cylinder A does not generate any fluid pressure (viz.fluid pressure is not fed into the port $P_1$), the expansion and bypass valves 22 and 24 are moved respectively into the left-hand positions shown in FIG. 1 with the control pressure from the pump C acting on the valves 22 and 24 on their right sides. As a result, the expansion valve 22 provides communication between the passages 14 and 16 and the bypass valve 24 provides communication between the passages 16 and 18 and obstructs communication between the passages 18 and 20. On the other hand, the regulator valve 30 is moved into a left-hand position in the drawing with the fluid pressure from the pump C acting on the valve 30 on its right side.

(2) When the brake pedal 62 is depressed so that the fluid pressure is fed from the master cylinder A into the chambers 60 and 46 and the passage 44 and is increased above a predetermined value to increase the pressure in the chambers 46 and 60, the fluid pressures in the chambers 60 and 46 and the passage 44 act respectively on the expansion, bypass and regulator valves 22, 24 and 30 on their left sides in the drawing to increase the forces urging the valves 22, 24 and 30 rightwards. In this instance, the regulator valve 30 is moved some amount rightwards by the fluid pressure acting on the valve 30 from the passage 44 so that the fluid pressure in the passage 34 is increased by an orifice effect. In this state, the regulator valve 30 is moved to a position where equilibrium is established. In the case of the bypass valve 24, although the fluid pressures act respectively on the right and left sides of the valve 24, since the force pushing the valve 24 leftwards is greater than the force pushing the valve 24 rightwards, the bypass valve 24 is held in the left-hand position so that it provides communication between the passages 16 and 18 and obstructs communication beween the passages 18 and 20.

In the case of the expansion valve 22, since the solenoid coil 54 is not energized when the signal for reducing the braking pressure is not generated as when the deceleration of the vehicle is not excessively great, the armature 48 and the ball 50 are held in an upper position shown in FIG. 1 in which the ball 50 closes the passage 43. As a result, the fluid pressure is fed from the passage 34 into the chamber 26 to push the expansion valve 22 and the check valves 56 and 58 leftwards. Since the force pushing the valves 22, 56 and 58 leftwards is greater than the force pushing the expansion valve 22 rightwards due to a relatively large area of the valve 22 which is acted on by the fluid pressure in the chamber 26, the expansion valve 22 is held in the left-hand position shown in the drawing.

Accordingly, the fluid pressure from the master cylinder A is conducted into the wheel cylinder B by way of the passages 14, 16 and 18 and the chambers 60 and 46.

(3) The event of the signal for reducing the braking pressure being generated.

When the braking pressure is increased and the deceleration of the vehicle exceeds a predetermined value, the solenoid coil 54 is fed with an electric current and is energized. This electric current is generated in and is controlled by a computer circuit in a module (not shown). When the solenoid coil 54 is energized, the armature 48 is moved by a magnetic force together with the armature ball 50 downwards in the drawing to open the passage 43. As a result, the fluid pressure acting on the right side of the expansion valve 22 is returned into the reservoir D through the port $P_4$ to reduce to zero and the expansion valve 22 is pushed rightwards by the braking pressure acting on the left side of the valve 22. At this time, the valves 56 and 58 of the check valve 55 are closed to obstruct communication between the passages 14 and 16. Accordingly, the hydraulic fluid confined in the piping for the wheel cylinders B expands by a volume formed by the rightward movement of the expansion valve 22 to reduce the fluid pressure in the piping. Accordingly, the braking force is removed or reduced so that skid is prevented. The bypass and regulator valves 24 and 30 are both held in the same positions as those in the case of (2) mentioned above.

2. The event of a trouble occurring in a pressurized hydraulic fluid circuit including the pump C, the piping such as the passages 32, 34, 36 and 42, and so on.

In this instance, since the fluid pressure in the circuit is reduced to zero, the expansion, bypass and regulator valves 22, 24 and 30 are all moved by the braking pressure into their right-hand positions, respectively, in the drawing. As a result, the check valve 55 obstructs communication between the passages 14 and 16 and the differential valve 45 obstructs communication between the passages 16 and 18 and provides communication between the passages 20 and 18 through the chamber 46 to directly connect the master cylinder A and the brake units B. Accordingly, in spite of the malfunction of the pressurized hydraulic fluid circuit, the braking operation is made possible to assure the safety of the vehicle. However, in this instance, even if the signal for reducing the braking pressure is generated, a skid control operation is not provided.

In the conventional anti-skid device 10 thus described, since, when the pump C is not operated, the hydraulic fluid pressure is absent in each of the chambers 26 and 28, the expansion and bypass valves 22 and 24 are both moved rightwards by the hydraulic fluid pressure from the master cylinder acting on the left side thereof. As a result, the check valve 55 is closed to obstruct communication between the passages 14 and 16 and the differential valve 45 obstructs communication between the passages 16 and 18 as mentioned hereinbefore. Thus, since the passage 16 is completely isolated from the outside of same, it is impossible to remove air in the passage 16 in this state. Accordingly, it has been necessary to perform a work of removing air in a condition in which the engine is made running to operate the pump C and to move the expansion and bypass valves 22 and 24 by the hydraulic fluid pressure from the pump C into their left-hand positions shown in the drawing. This is undesirable in the safety of the operator performing the air removing work.

SUMMARY OF THE INVENTION

It is, therefore, an object of the invention to provide a hydraulic anti-skid device for a hydraulic braking system of a vehicle, in which it is possible to remove air confined in a passage which is closed by a bypass valve of the anti-skid device and is located between the bypass valve and an expansion valve of the device, in a condition in which the engine of the vehicle is not run so that the safety of the operator performing the air removing work is ensured.

This object is accomplished by providing locking means for locking the expansion valve in an open position in which the expansion valve provides communication between the passages upstream and downstream of the expansion valve during air removing work and further by providing an air bleeder for, when being opened, allowing air confined in the passage located between the expansion valve and the bypass valve to escape to the atmosphere.

BRIEF DESCRIPTION OF THE DRAWINGS

This and other features and advantages of the invention will become more apparent from the following detailed description taken in connection with the accompanying drawings in which:

FIG. 2 is a cross sectional schematic view of a preferred embodiment of a hydraulic anti-skid device according to the invention.

DESCRIPTION OF THE SPECIFIC EMBODIMENT

Figure 1:
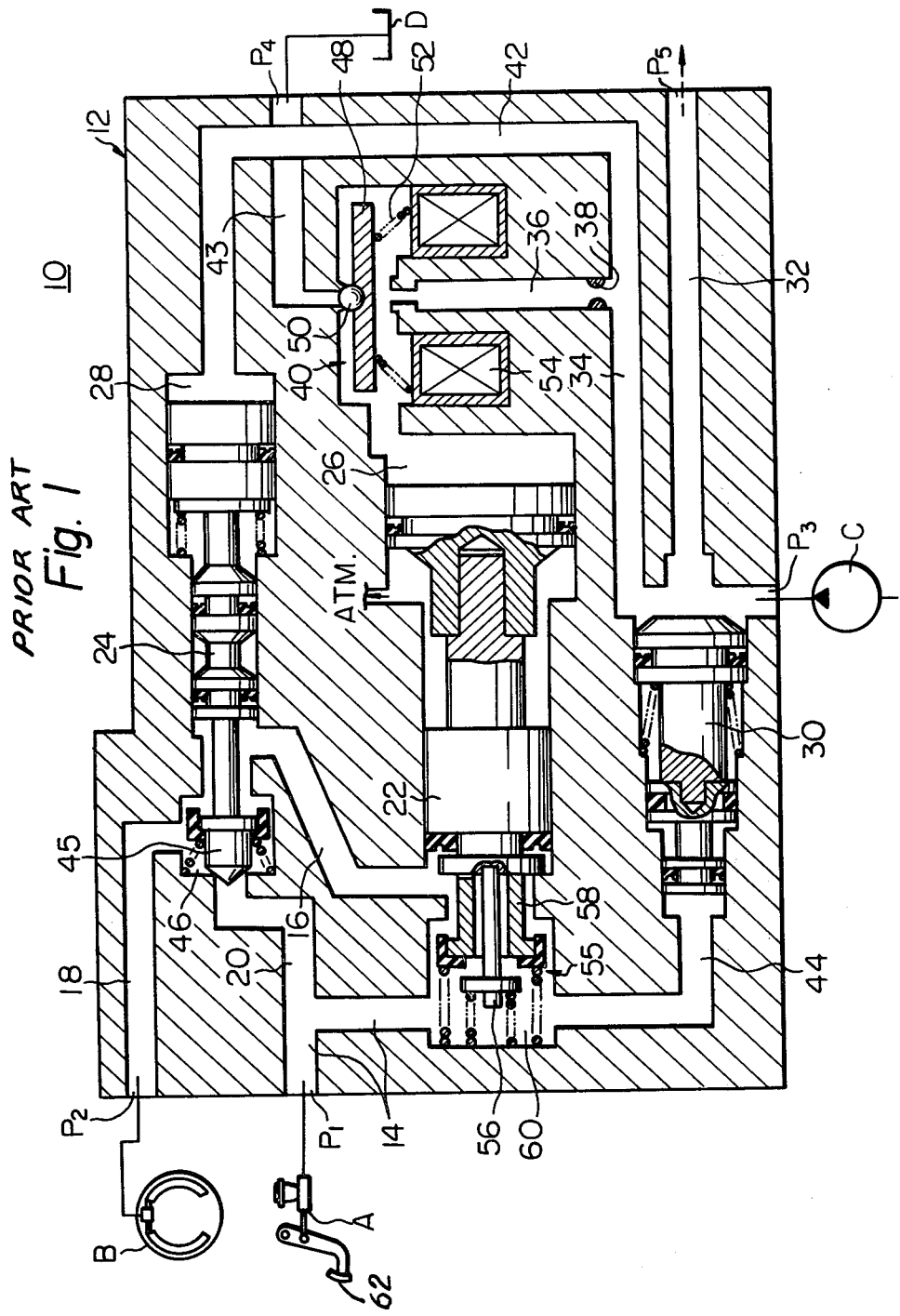
FIG. 1 is a cross sectional schematic view of a prior art hydraulic anti-skid device as per the introduction of the present specification.

Referring to FIG. 2 of the drawings, there is shown a hydraulic anti-skid device according to the invention. In FIG. 2, the same component elements as those of the anti-skid device shown in FIG. 1 are designated by the same reference numerals as those used in FIG. 1 and the description as to the same component elements is omitted for purpose of brevity. The hydraulic anti-skid device, generally designated by the reference numeral 70, is characterized in that it is provided with locking means 72 which prevents the expansion valve 22 from being moved by the hydraulic fluid pressure in the chamber 60 into a closed position or the right-hand position in which the expansion valve 22 or the check valve 55 is closed to obstruct communication between the passages 14 and 16 located upstream and downstream of the check valve 55. A bore 73 is formed through a wall 74 of a cylindrical chamber or cavity 76 in which a plunger or spool 78 of the expansion valve 22 is axially slidably fitted. The bore 73 opens into the cylindrical cavity 76. The locking means 72 comprises a manually operated stop pin 82 axially slidably fitted at an inner portion thereof in an inner portion of the bore 73, and a cap 84 which is threadedly received in an outer portion of the bore 73 and in which the pin 82 is slidably fitted or located at an outer portion thereof. In this embodiment, the diameter of the outer portion of the pin 82 is smaller than that of the inner portion thereof. The cap 84 functions to limit movement of the pin 82 in an outer direction to prevent the pin 82 from slipping out of the bore 73 to the outside thereof.

The pin 82 has a protruded or operative position in which an inner end portion of the pin 82 is protruded from the bore 73 into the cylindrical cavity 76 and a retracted or rest position in which the inner end portion is retracted into or located in the bore 73. The pin 82 has a portion piched by fingers for manually moving the pin 82 from the rest position into the operative position and vice versa. A split pin 86 is provided which is locatable in the pin 82 to extend through a bore (no numeral) formed through the outer portion thereof perpendicular to the axis of the pin 82 and which is removable from the pin 82. The split pin 86, when it is in a retaining position in which it is located in the pin 82, contacts with the pin 82 and an outer surface of the cap 84 to hold or retain the pin 82 in the retracted position. The split pin 86, when it is in a non-retaining position in which it is removed from the pin 82, allows the pin 82 to be moved or move into the protruded position. The split pin 86 has a portion pinched by fingers for manually moving the split pin 86 from the retaining position into the non-retaining position and vice versa. The stop pin 82 is positioned in such a location that it, when is in the protruded position, engages against an end face or a shoulder of the plunger 78 of the expansion valve 22 or engages in a groove of the plunger 78 to lock the expansion valve 22 in an open position such as the left-hand position shown in the drawing in which the check valve 55 is opened to provide communication between the passages 14 and 16.

An air bleed screw or air bleed valve 88 is threadedly received in a bore formed through a wall of the passage 16. The air bleed 88 is constructed and arranged in such a manner as to provide communication between the passage 16 and the atmosphere to allow air in the passage 16 to escape to the atmosphere when the screw is loosened or the valve is opened and to obstruct communication between the passage 16 and the atmosphere when the screw is retightened or the valve is closed.

The air removing work or air bleeding of the anti-skid device 70 thus described is performed as follows.

When the pin 82 is moved into the cylindrical chamber 76 by pulling the split pin 86 out of the bore of the pin 82 when the expansion valve 22 is in the open position as shown in the drawing in which the check valve 55 provides communication between the passages 14 and 16, the pin 82 engages against the plunger 78 of the expansion valve 22 so that the expansion valve 22 is locked in the open position. In this state, when the air bleed 88 is opened by rotating it to provide communication between the passage 16 and the atmosphere, the hydraulic fluid pressure is fed into and fills the passage 16, to remove or expell air from the passage 16 to the atmosphere by way of the air bleed 88. After completion of removal of air from the passage 16, the air bleed 88 is closed by rotating it to obstruct communication between the passage 16 and the atmosphere. Then the pin 82 is returned or retracted into the rest position and the split pin 86 is inserted through the bore of the pin 82 to lock same in the rest position. In this state, the pin 82 does not interfere with or is disengaged from the expansion valve 22 to make it possible for the expansion valve 22 to be moved into the right-hand position to normally perform the anti-skid operation.

When the expansion valve 22 is not located in the open position as shown in the drawing but is located in the closed position or the right-hand position, the pin 82 can not be inserted to carry out the function of locking the expansion valve 22 in the open position. In this instance, after the engine is run to operate the pump C and provide hydraulic fluid pressure in the chamber 26 and the expansion valve 22 is moved by the fluid pressure in the chamber 26 into the open position or the left-hand position, the pin 82 can be inserted into the cylindrical chamber 76 to lock the expansion valve 22 in the open position. In this state, after the engine is stopped the air removing work can be performed in the afore mentioned manner.

It will be appreciated that the invention provides a hydraulic anti-skid device comprising locking means for locking an expansion valve and a check valve of the device in an open position in which the check valve is opened to provide communication between first and second passages located upstream and downstream of the check valve, respectively, during the air removing work and an air bleeder for providing communication between the second passage and the atmosphere when is opened so that the air removing work can be accomplished without keeping the engine running and the pump operative.

It will be also appreciated that the invention provides a hydraulic anti-skid device in which a conventional hydraulic anti-skid device is improved by the addition of both the locking means and the air bleeder thereto so that the air removing work can be carried out without reducing the safety of the operator performing the air removing work.

What is claimed is:

1. A hydraulic anti-skid device for a hydraulic braking system, comprising a pump generating a hydraulic fluid pressure, means defining a first passage receiving a hydraulic braking pressure, means defining a second passage communicable with said first passage, means defining a third passage communicating with said first passage, means defining a fourth passage alternatively communicable with said second and third passages for passing the braking pressure from said first passage to the outside of said anti-skid device, an expansion valve located between said first and second passages for controlling communication therebetween, said expansion valve having first means fed with the hydraulic fluid pressure from said pump, said expansion valve assuming a first position in which it effects communication between said first and second passages when said first means is fed with the hydraulic fluid pressure and a second position in which it obstructs communication between said first and second passages when said first means is not fed with the hydraulic fluid pressure, a bypass valve located between said fourth passage and both said second and third passages for controlling communication therebetween, said bypass valve having second means fed with the hydraulic fluid pressure, said bypass valve assuming a first position in which it effects communication between said second and fourth passages and obstructs communication between said third and fourth passages when said second means is fed with the hydraulic fluid pressure and a second position in which it obstructs communication between said second and fourth passages and effects communication between said third and fourth passages when said second means is not fed with the hydraulic fluid pressure, manually operated locking means engageable with said expansion valve for locking said expansion valve in said first position, said locking means having a rest position in which it is disengaged from said expansion valve for permitting same to be moved into said second position and an operative position in which it is engaged with said expansion valve for preventing same from being moved into said position, said locking means having means for manually moving said locking means from said rest position into said operative position and vice versa, and manually operated retaining means engageable with said locking means for retaining said locking means in said rest position, said retaining means having a retaining position in which it is engaged with said locking means for retaining same in said rest position and a non-retaining position in which it is removed from said locking means for permitting same to be moved into said operative position, said retaining means having means for manually moving said retaining means from said retaining position into said non-retaining position and vice versa.

2. A hydraulic anti-skid device as claimed in claim 1, in which said second passage is communicable with the atmosphere, said anti-skid device further comprising a manually operated air bleeder for controlling communication between said second passage and the atmosphere, said air bleeder assuming normally a closed position in which it obstructs communication between said second passage and the atmosphere and, when said expansion valve is in said first position and said bypass valve is in said second position, an open position in which it effects communication between said second passage and the atmosphere, said air bleeder having means for manually moving said air bleeder from said open position and vice versa.

3. A hydraulic anti-skid device as claimed in claim 1, in which said expansion valve is formed of a slidable spool, and said locking means is formed of a slidable pin engaged with and disengaged from said spool when said locking means is in said operative and rest positions respectively, and said retaining means is formed of a split pin which is engaged with said slidable pin when said slidable pin is in said rest position and said retaining means is in said retaining position and which is removed from said slidable pin when said slidable pin is in said operative position and said retaining means is in said non-retaining position.

4. A hydraulic anti-skid device for a hydraulic braking system, comprising a pump generating a hydraulic fluid pressure, a housing having therein means defining a first passage receiving a hydraulic braking pressure, means defining a second passage communicable with said first passage and with the atmosphere, means defining a third passage communicating with said first passage, and means defining a fourth passage alternatively communicable with said second and third passages for passing the braking pressure from said first passage to the outside of said anti-skid device, an expansion valve located in said housing and between said first and second passages for controlling communication therebetween, said expansion valve having first means fed with the hydraulic fluid pressure from said pump, said expansion valve assuming a first position in which it effects communication between said first and second passages when said first means is fed with the hydraulic fluid pressure and a second position in which it obstructs communication between said first and second passages when said first means is not fed with the hydraulic fluid pressure, a bypass valve located in said housing and between said fourth passage and both said second and third passages for controlling communication therebetween, said bypass valve having second means fed with the hydraulic fluid pressure, said bypass valve assuming a first position in which it effects communication between said second and fourth passages and obstructs communication between said third and fourth passages when said second means is fed with the hydraulic fluid pressure and a second position in which it obstructs communication between said second and fourth passages and effects communication between said third and fourth passages when said second means is not fed with the hydraulic fluid pressure, locking means received in said housing and engageable with said expansion valve for locking said expansion valve in said first position, said locking means having a rest position in which it is disengaged from said expansion valve for permitting same to be moved into said second position and an operative position in which it is engaged with said expansion valve for preventing same from being moved into said second position, and an air bleeder received in said housing for controlling communication between said second passage and the atmosphere, said air bleeder assuming normally a closed position in which it obstructs communication between said second passage and the atmosphere and, when said expansion valve is in said first position and said bypass valve is in said second position, an open position in which it effects communication between said second passage and the atmosphere and being movable between said closed and open positions, in which said locking means is of a manually operated type and has means for manually moving said locking means from said rest position into said operative position and vice versa, said anti-skid device further comprising manually operated retaining means engageable with said locking means and said housing for retaining said locking means in said rest position, said retaining means having a retaining position in which it is engaged with said locking means and said housing for retaining said locking means in said rest position and a non-retaining position in which it is removed from said locking means and said housing for permitting said locking means to be moved into said operative position, said retaining means having means for manually moving said retaining means from said retaining position into said non-retaining position and vice versa.

* * * * *